United States Patent
Ito et al.

(10) Patent No.: US 7,257,540 B2
(45) Date of Patent: Aug. 14, 2007

(54) VOICE BROWSER APPARATUS AND VOICE BROWSING METHOD

(75) Inventors: Fumiaki Ito, Yokohama (JP); Yuji Ikeda, Kawasaki (JP); Takaya Ueda, Yokohama (JP); Kenichi Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 09/839,309

(22) Filed: Apr. 23, 2001

(65) Prior Publication Data

US 2002/0010586 A1 Jan. 24, 2002

(30) Foreign Application Priority Data

Apr. 27, 2000 (JP) .............................. 2000-127525

(51) Int. Cl.
*G10L 11/00* (2006.01)
(52) U.S. Cl. ...................................... 704/275; 704/270
(58) Field of Classification Search ................ 704/270, 704/275
See application file for complete search history.

(56) References Cited

U.S. PATENT DOCUMENTS 6,115,686 A * 9/2000 Chung et al. ............... 704/260
6,269,336 B1 * 7/2001 Ladd et al.
6,381,597 B1 * 4/2002 Lin .............................. 707/4
6,385,583 B1 * 5/2002 Ladd et al.
6,426,956 B1 * 7/2002 Eteminan
6,954,898 B1 * 10/2005 Nakai et al. ................ 715/542

* cited by examiner

*Primary Examiner*—Michael N. Opsasnick
(74) *Attorney, Agent, or Firm*—Fitzpatrick, Cella, Harper & Scinto

(57) ABSTRACT

In a voice browser apparatus, an HTML document is obtained from a designated URL, the obtained document is analyzed based on a rule designated from a plurality of rules for defining voice input/output contents to fetch voice output contents, voice input candidates and designation information for designating a next object of processing corresponding to each voice input candidate, and the fetched voice output contents are voice-outputted. Then, the voice input from a user for this output is voice-recognized, and controls obtainment of a new document and next analysis based on designation information corresponding to the input candidate matching the recognition result. Thereby, contents for the graphical user interface can easily be browsed using voice input/output.

11 Claims, 8 Drawing Sheets

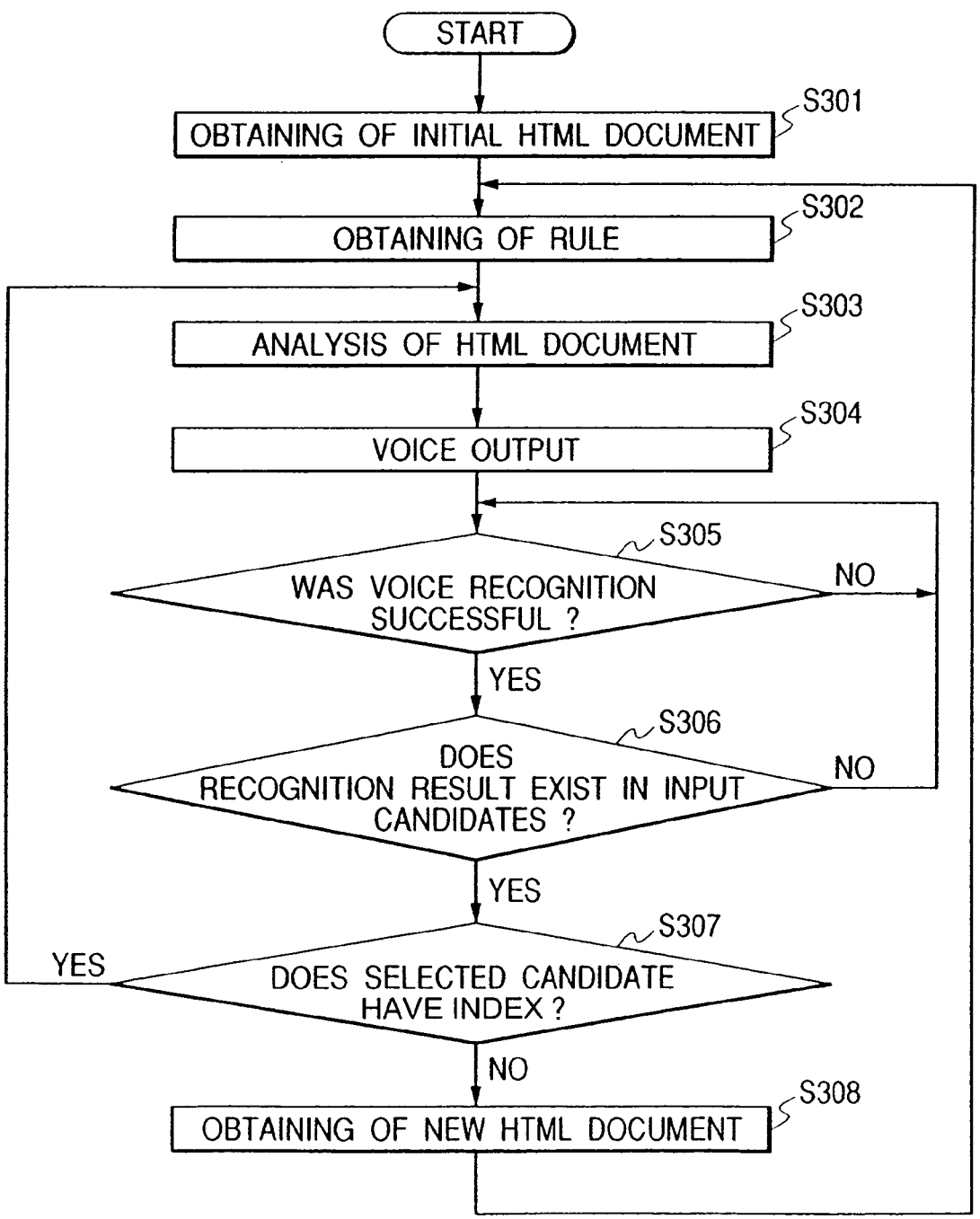

FIG. 4

```
<!DOCTYPE HTML PUBLIC "-//IETF//DTD HTML//EN" >
<HTML>
<HEAD>
<TITLE>Restaurant Guide</TITLE>
</HEAD>
<BODY>
PLEASE SELECT GENRE OF SHOP FROM THE FOLLOWING
<UL>
<LI><A HREF= "#french" >FRENCH</A>
<LI><A HREF= "#italian" >ITALIAN</A>
</UL>
<HR>
<A NAME= "french" >FRENCH</A><BR>
PLEASE SELECT SHOP
<UL>
<LI><A HREF= "shop1.html" >○○</A>
<LI><A HREF= "shop2.html" >△△</A>
</UL>
<HR>
<A NAME= "italian" >ITALIAN</A><BR>
PLEASE SELECT SHOP
<UL>
<LI><A HREF= "shop3.html" >▽▽</A>
<LI><A HREF= "shop4.html" >□□</A>
</UL>
</BODY>
</HTML>
```

FIG. 5

```
<!DOCTYPE HTML PUBLIC "-//IETF//DTD HTML//EN" >
<HTML>
<HEAD>
<TITLE>Restaurant Guide</TITLE>
</HEAD>
<BODY>
<VB MODE= "H" output=
 "PLEASE SELECT GENRE OF SHOP, AND THEN SELECT SHOP" >
PLEASE SELECT SHOP
<H2>FRENCH</H2>
<UL>
<LI><A HREF= "shop1.html" >○○</A>
<LI><A HREF= "shop2.html" >△△</A>
</UL>
<H2>ITALIAN</H2>
<UL>
<LI><A HREF= "shop3.html" >▽▽</A>
<LI><A HREF= "shop4.html" >□□</A>
</UL>
</BODY>
</HTML>
```

FIG. 6

| | | | |
|---|---|---|---|
| PLEASE SELECT GENRE OF SHOP, AND THEN SELECT SHOP. FRENCH. ITALIAN | | | —601 |
| | | | —602 |
| | 603 | 604 | 605 |
| | FRENCH | http://guide/index2.html | <H2>FRENCH</H2> |
| | ITALIAN | http://guide/index2.html | <H2>ITALIAN</H2> |

FIG. 7

| | | |
|---|---|---|
| ITALIAN.▽▽.□□. | | |
| ▽▽ | http://guide/shop3.html | |
| □□ | http://guide/shop4.html | |

FIG. 8

PLEASE SELECT GENRE OF SHOP
FROM THE FOLLOWING
 • FRENCH
 • ITALIAN

FRENCH
PLEASE SELECT SHOP
 • ○○
 • △△

ITALIAN
PLEASE SELECT SHOP
 • ▽▽
 • □□

FIG. 9

PLEASE SELECT SHOP
 • FRENCH
 • ○○
 • △△
 • ITALIAN
 • ▽▽
 • □□

FIG. 10

```
<!DOCTYPE HTML PUBLIC "-//IETF//DTD HTML//EN" >
<HTML>
<HEAD>
<TITLE>Restaurant Guide</TITLE>
</HEAD>
<BODY>
<VB MODE= "L" >
PLEASE SELECT SHOP
<H2>FRENCH</H2>
<UL>
<LI><A HREF= "shop1.html" >○○</A>
<LI><A HREF= "shop2.html" >△△</A>
</UL>
<H2>ITALIAN</H2>
<UL>
<LI><A HREF= "shop3.html" >▽▽</A>
<LI><A HREF= "shop4.html" >□□</A>
</UL>
</BODY>
</HTML>
```

VOICE BROWSER APPARATUS AND VOICE BROWSING METHOD

BACKGROUND OF THE INVENTION

1. Field of the Invention

The present invention relates to a voice browser apparatus for processing documents written in a predetermined markup language by voice interaction, a method therefor, and a program therefor.

2. Related Background Art

Conventionally, access has been made to Web contents by means of a browser using the graphical user interface (GUI). Recently, voice browsers for making access to Web contents by means of voice interaction have come into use for the purpose of making access via telephones, and so on.

In the voice browser, Web contents are voice-outputted. For voice output, there are cases where contents written in text are converted into voices through voice synthesis and are outputted, and cases where contents prepared as voice data through recording are played back and outputted. This voice output is equivalent to display of pages in the browser in the graphical user interface.

In the browser in the graphical user interface, movement to next contents and input in a form are performed through mouse operation and keyboard entry, but in the voice browser, they are done through voice input. That is, a user's voice input is voice-recognized, and the recognition result is used to perform movement to next contents and input in the form.

There is a method in which a dedicated markup language is used as these contents for voice browsers. In this method, however, access cannot be made to the contents by the browser of the graphical user interface, and with this voice browser, access cannot be made to contents for the graphical user interface that currently exist numerously. Thus, there is a method in which HTML, a markup language that is used in the browser of the graphical user interface, is used also in the voice browser.

In this method, output contents and input candidates in voice, namely contents of processing suitable for voice recognition vocabularies and man-power, are determined from contents written in HTML, according to a specific rule. For example, there is a voice browser apparatus using rules as described below.

First, output contents shall constitute the text ranging from the head to the end of the HTML document to be subjected to browsing. However, if the URL indicates some midpoint in the HTML document, the output contents shall cover the range therefrom, and if there is an <HR> tag at some midpoint, the output contents shall cover the range ending with the tag. The input candidate shall constitute an anchor in the same range (text in the range surrounded by the <A> tag). When a word existing in the input candidate is inputted, the target to which it is linked is defined as a new object of browsing to perform similar processing.

For example, the case where the HTML document shown in FIG. 4 is targeted will be discussed. Assume that the URL of this HTML document is "http://guide/index.html". First, the voice browser outputs "Please select a genre of shops from the following. French. Italian." with a voice, and waits for a user's input. When the user inputs "Italian" with a voice, for example, the voice browser performs similar processing from the position of the HTML document of "http://guide/index.html #italian". In other words, it outputs "Please select a shop. ∇∇. □□.", and waits for the user's input. When the user inputs "∇∇", for example, it obtains the HTML document of "http://guide/shop3.html" to carry out similar processing.

However, for the above described device of conventional example, contents must be described in accordance with a specific rule, thus raising a disadvantage that flexibility is reduced when contents are created also for the graphical user interface.

SUMMARY OF THE INVENTION

Thus, an objective of the present invention is to provide a voice browser apparatus in which a plurality of rules for defining output contents and input candidates in the form of voice from contents written in markup language for the graphical user interface, such as HTML, is prepared, thus allowing a user or a content creator to designate which rule of them is used.

According to an aspect of the present invention, rule selecting means selects a rule defining voice input/output contents from a plurality of predetermined rules, document analyzing means analyze a designated range of a document obtained, based on the rule selected by the rule selecting means, and voice output contents, voice input candidates, and designation information are fetched.

Other objectives and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a flowchart showing an outline of processing in Embodiment 1;

FIG. 4 shows an example of an HTML document treated by a conventional device;

FIG. 5 shows an example of an HTML document treated by a device of the embodiment;

FIG. 6 shows a specific example of the contents of an input/output contents storing portion;

FIG. 7 shows a specific example of the contents of the input/output contents storing portion;

FIG. 8 shows an example of displaying an HTML document treated by the conventional device;

FIG. 9 shows an example of displaying another HTML document treated by the conventional device;

FIG. 10 shows an example of another HTML document treated by the device of the embodiment;

DESCRIPTION OF THE PREFERRED EMBODIMENTS

One preferred embodiment according to the present invention will be described below with reference to accompanying drawings.

Embodiment 1

Figure 1:
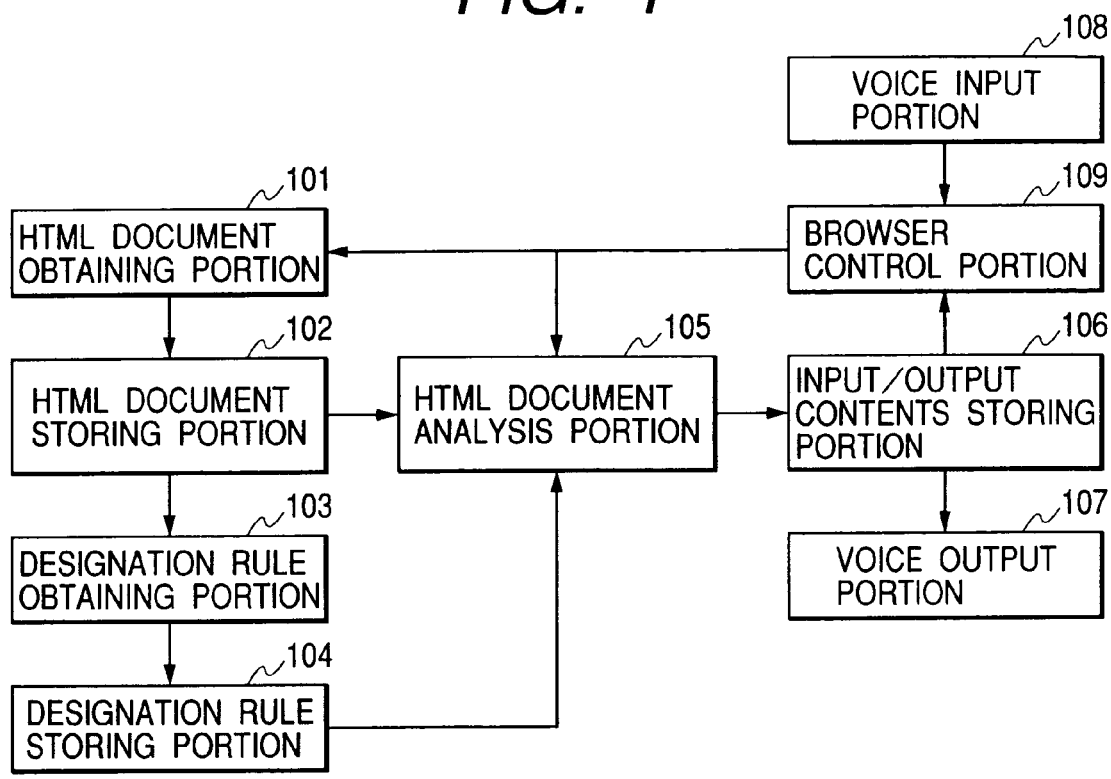
FIG. 1 is a block diagram showing a basic configuration of a voice browser apparatus according to Embodiment 1.

FIG. 1 is a block diagram showing a basic configuration of a voice browser apparatus according to Embodiment 1.

In this figure, an HTML document obtaining portion 101 obtains a designated HTML document. An HTML document storing portion 102 stores the HTML document obtained by the HTML document obtaining portion 101. A designation rule obtaining portion 103 obtains a rule defining voice input/output contents designated in the HTML document stored in the HTML document storing portion 102. A designation rule storing portion 104 stores the designation rule obtained by the designation rule obtaining portion 103.

An HTML document analysis portion 105 analyzes the HTML document stored in the HTML document storing portion 102 to fetch the contents of voice input/output (contents to be voice-outputted, and candidates of contents to be voice-inputted from a user), in accordance with the rule stored in the designation rule storing portion 104. An input/output contents storing portion 106 stores the voice input/output contents analyzed and fetched by the HTML document analysis portion 105. A voice output portion 107 voice-synthesizes and voice-outputs the voice output contents stored in the input/output contents storing portion 106, as required.

A voice input portion 108 accepts the voice input from the user and voice-recognizes the same. A browser control portion 109 checks the result of recognition of the input contents in the voice input portion 108 against the voice input candidates stored in the input/output contents storing portion 106 to control obtainment of a new HTML document by the HTML document obtaining portion 101 and analysis of the HTML document by the HTML document analysis portion 105.

Figure 2:
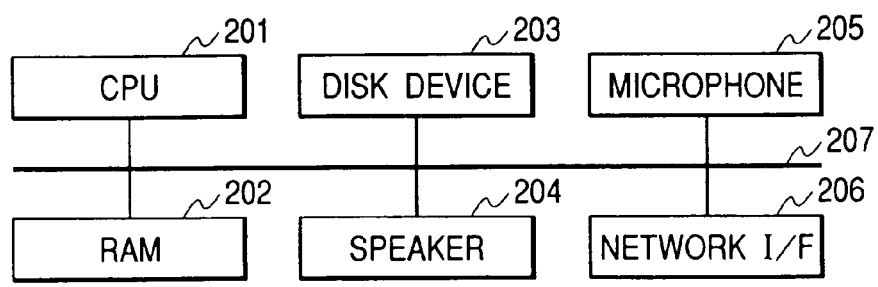
FIG. 2 shows a hardware configuration of the voice browser apparatus according to Embodiment 1.

FIG. 2 shows a hardware configuration of the voice browser apparatus of this embodiment. In this figure, a CPU 201 operates in accordance with a program for achieving a procedure described later to control each portion of the device. A RAM 202 provides a memory area required for operations of the HTML document storing portion 102, the designation rule storing portion 104, the input/output contents storing portion 106 and the above described program. A disk device 203 stores a program for achieving a procedure described later.

A speaker 204 outputs voice data generated by the voice output portion 107. A microphone 205 inputs voice data that is processed by the voice input portion 108. A network interface 206 achieves communication via a network at the time when the HTML document obtaining portion 101 obtains the HTML document through the network. A bus 207 connects the above described portions.

A processing procedure of the voice browser apparatus of this embodiment will be described below, referring to the flowchart in FIG. 3.

First, in Step S301, an initial HTML document is obtained. For this initial HTML document, any document such as a document predetermined by the voice browser apparatus, a document defined by the user and the most recently accessed document may be obtained. In any case, a URL of the source from which the initial HTML document is obtained is defined. The HTML document obtaining portion 101 sends a HTTP request via the network in accordance with this URL to obtain the initial HTML document, or obtains the initial HTML document from a file previously stored in the disk device in the apparatus. The obtained HTML document is stored in the HTML document storing portion 102 and a movement to Step S302 is made.

In Step S302, from the HTML document stored in the HTML document storing portion 102, data for designating a rule defining the voice input/output contents described in the document is obtained. In this embodiment, the rule is designated in accordance with the value of the attribute MODE of the <VB> tag in the HTML document, and this value is stored in the designation rule storing portion 104. The rule itself in accordance with the value is previously incorporated in the apparatus as a program of the HTML document analysis portion 105. For example, in the case where the HTML document shown in FIG. 5 is processed, "H" is stored in the designation rule storing portion 104. If there is no <VB> tag in the HTML document, "L" is stored in the designation rule storing portion 104. Then, a movement to Step S303 is made.

The rule used in this embodiment will now be described. In this embodiment, the rule in the case where the value for the designation rule storing portion 104 is "H" is as follows. Initial output contents shall be the value of the OUTPUT attribute of the <VB> tag and input candidates that will be described subsequently. The input candidates shall be respective indexes surrounded by the <H> tag in the HTML document. When a statement included in the input candidate is inputted, the following processing is performed. First, next output contents shall constitute the text ranging from the selected index to the next <H> tag or to the end of the document. And the input candidate shall constitute an anchor in the same range (text in the range surrounded by the <A> tag). When a statement included in the input candidate is inputted, the target to which it is linked is defined as a new object of browsing to perform similar processing.

On the other hand, in this embodiment, the rule in the case where the value for the designation rule storing portion 104 is "L" is a rule to perform the processing procedure described as a prior art. That is, output contents shall be the text ranging from the head to the end of the HTML document that is an object of browsing. However if the URL indicates some midpoint in the HTML document, the output contents shall cover the range therefrom, and if there is an <HR> tag at some midpoint, the output contents shall cover the range ending with the tag. The input candidate shall constitute an anchor in the same range. When a statement included in the input candidate is inputted, the target to which it is linked is defined as a new object of browsing to perform similar processing.

In Step S303, in accordance with the rule appropriate to the value stored in the designation rule storing portion 104, the HTML document stored in the HTML document storing portion 102 is analyzed to fetch the contents of voice input/output and stores the same in the input/output storing portion 106. Then, a movement to Step S304 is made.

FIG. 6 shows an example of the contents of the input/output contents storing portion 106 in this embodiment. An area 601 stores text that constitutes voice output contents. An area 602 stores input candidates and data for defining respective processing. In FIG. 6, data for each input candidate is shown with one line. In each line, an input candidate is stored in a column 603. The URL shown by the HTML page that represents an object of processing after the candidate is inputted is stored in a column 604. The pattern of the index of the front-end to be subjected to processing next is stored in a column 605 in the case where the designation rule is that of "H".

In Step S303, if the value stored in the designation rule storing portion 104 is H, processing is varied depending on whether a movement is made from Step S302 or from Step S307.

In the former case, the value of the OUTPUT attribute of the <VB> tag, and the input candidate that will be described subsequently are stored in the area 601 of the input/output contents storing portion 106. Also, each index surrounded by the <H> tag in the HTML document is stored in the column 603 as the input candidate. And, the URL of the HTML document currently under processing is stored in the column 604 for each index. In addition, the pattern including the tag of each index is stored in the column 605.

In the latter case, the pattern of the column 605 for the candidate selected in step S306 is sought out from the HTML document stored in the HTML document storing portion 102, and the text ranging therefrom to the next <H> tag or to the end of the document is stored in the area 601 of the input/output contents storing portion 106. Then, the anchor existing in the same range is defined as the input candidate, and the URL of the target to which it is linked is stored in the column 604 for each candidate. The column 605 shall be empty.

On the other hand, if the value stored in the designation rule storing portion 104 is "L", text ranging from the head to the end of the HTML document is stored in the area 601 as voice output contents. However, if the URL indicates some midpoint of the HTML document, the range shall start therefrom, and if there is an <HR> tag at some midpoint, the range shall end with the tag. Then, the input candidate is defined as the anchor in the same range, and the URL of the target to which it is linked is stored in the column 604 for each candidate. The column 605 shall be empty. FIG. 6 shows a state of the input/output contents storing portion 106 when the HTML shown in FIG. 5 is processed.

In Step S304, the text stored as output contents in the area 601 of the input/output contents storing portion 106 is voice-synthesized and converted into voice data, and is outputted from the speaker 204. Then, a movement to Step S306 is made.

In Step S305, if voice input of specific level or greater in the microphone 205 is continued for a specific time period or longer, the voice data is voice-recognized. If the voice recognition is successful, then a movement to Step S306 is made. If no voice input is made, or recognition is unsuccessful, then Step S305 is repeated.

In Step S306, the result of the voice recognition in Step S305 is compared with the input candidates stored in the input/output contents storing portion 106. If there is an input candidate matching the result, a movement to Step S307 is made. If there is no candidate matching the result, a return to Step S305 is made.

In Step S307, examination on whether there is data of the index pattern of the column 605 in the input candidates selected in Step S306 is performed, and if the data exists therein, a return to Step S303 is made to perform processing of fetching such data as well as data thereafter. If the data does not exist, a movement to Step S308 is made.

In Step S308, an HTML document shown by the URL of the input candidate for which matching has been obtained in Step S306 is newly obtained and is stored in the HTML document storing portion 102. Then, a return to Step S302 is made.

The HTML document of FIG. 5 is stored in the HTML document storing portion 102, and if "Italian" is inputted when the input/output contents storing portion 106 is in the state shown in FIG. 6, the input/output content storing portion 106 newly enters a state as shown in FIG. 7. Thus, the input/output after the HTML document in FIG. 5 is stored in the HTML document storing portion 102 is as follows.

Output: Please select a genre of shops, and then select a shop. French. Italian.
Input: Italian
Output: Italian. ∇∇. □□.
Input: ∇∇
Output: . . .

The input/output in the case where the HTML document in FIG. 4 is initially stored in the HTML document storing portion 102 is as follows.

Output: Please select a genre of shops from the following. French. Italian.
Input: Italian
Output: Italian. Please select a shop. ∇∇. □□.
Input: ∇∇
Output: . . .

The example of displaying the HTML document in FIG. 4 with a normal browser is shown in FIG. 8, and the example of displaying the HTML document in FIG. 5 with a normal browser is shown in FIG. 9. In this way, use of the voice browser apparatus of this embodiment enables a plurality of descriptions such that contents for achieving similar voice interaction are displayed in a different form.

On the other hand, the input/output in the case where the HTML document in FIG. 10 is initially stored in the HTML document storing portion 102 is as follows.

Output: Please select a shop from the following. French. ○○. ∇∇. Italian. ∇∇. □□.
Input: ∇∇
Output: . . .

The HTML document in FIG. 10 is different from the HTML document in FIG. 5 only in the value of the MODE attribute of the <VB> tag. Use of the voice browser apparatus of this embodiment makes it possible to change the contents of voice interaction for the similar HTML document by only changing part of the tag.

Embodiment 2

In the above described Embodiment 1, the case where the rule for determining input/output contents is designated in the contents has been described, but it is not limited thereto, and the user may designate the rule. Also, it is possible to make both designation in contents and designation by the user to be acceptable and give a higher priority to any one of them.

Figure 11:
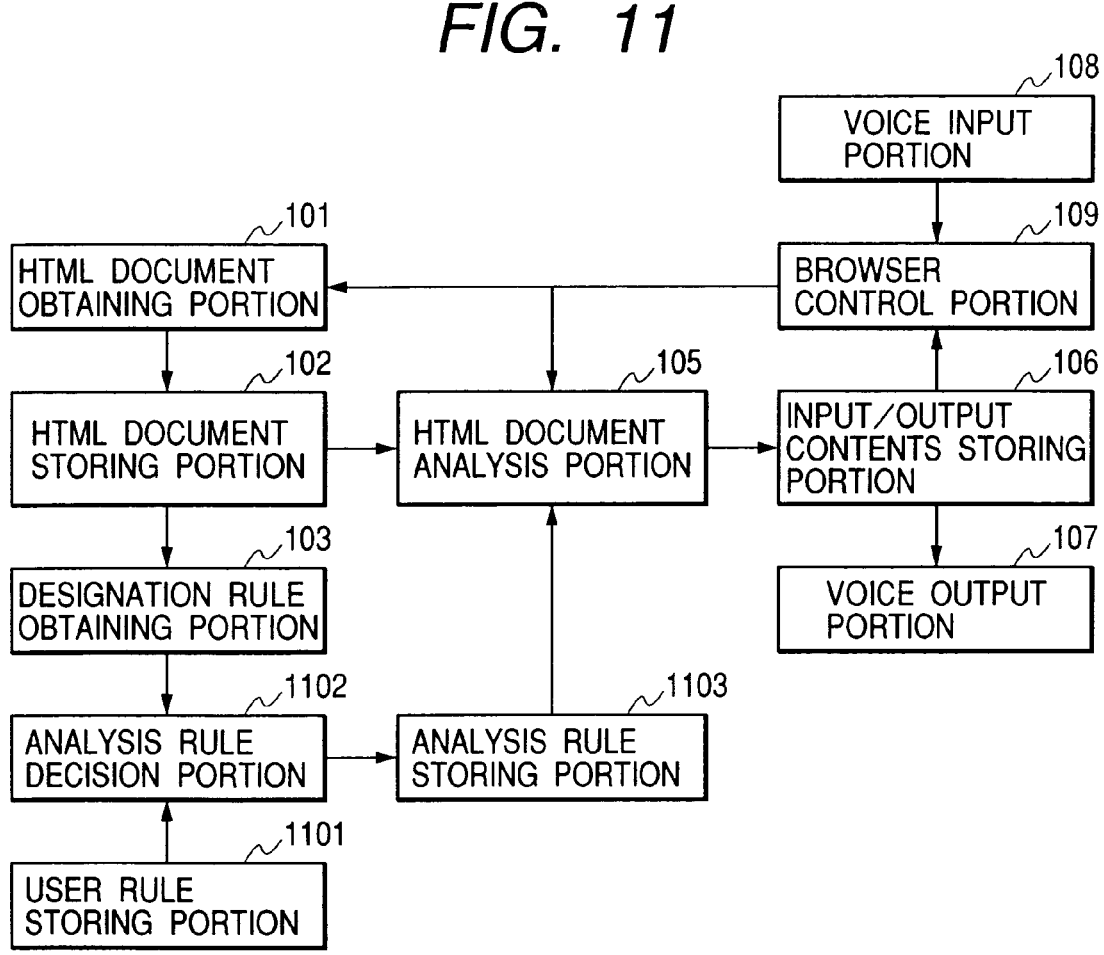
FIG. 11 shows a basic configuration of Embodiment 2.

FIG. 11 is a block diagram showing a basic configuration of a device according to Embodiment 2. In this figure, portions of 101 to 103 and 105 to 109 are similar to their counterparts in FIG. 1. Portions that make FIG. 11 distinguished from FIG. 1 will be described.

A user rule storing portion 1101 stores a rule defined by the user. An analysis rule decision portion 1102 decides which of the designation rule obtained by the designation rule obtaining portion 103 and the user rule stored in the user rule storing portion 1101 is given a higher priority. An analysis rule storing portion 1103 stores the analysis rule determined by the analysis rule decision portion 1102. And, the HTML document analysis portion 105 analyzes the HTML document stored in the HTML document storing portion 102 to fetch the contents of voice input/output, in accordance with the rule stored in the analysis rule storing portion 1103.

In this embodiment, there is the problem of which of the designation rule of contents and the user rule is given a higher priority, but any one of them may be given a higher priority on every occasion, for example. Also, the user may be allowed to determine which of them is given a higher priority. Alternatively, it is also possible to employ the user rule when there exists no tag for designating the rule in the HTML document, and to give a higher priority to the rule of making designation by the HTML document when a tag exists.

Other Embodiments

In the above described embodiments, the case where the user rule remains the same irrespective of HTML documents has been described, but the present invention is not limited thereto, and the user rule may be changed for each HTML document. If a specific command (for example, "list mode") is inputted after the HTML document is processed and voice-outputted, the user rule stored in the user rule storing portion 1101 may be changed.

In the above described embodiments, the case where when the user rule is changed, the result of the change takes effect from the next interaction has been described, but the present invention is not limited thereto, and the result may be made to take effect beginning with the object HTML document at the time of changing the user rule. For this purpose, processing may be performed again beginning with processing of analyzing the HTML document if the contents of the user rule storing portion 1101 are changed.

In the above described embodiments, the case where the rule directly designated by the user is defined as a user rule has been described, but the present invention is not limited thereto, and it is also possible to store in advance the rule to be applied for each HTML document and apply the stored rule each time the HTML document is processed. This can be achieved by storing in advance a table in which the URL of the HTML document corresponds to the rule to be applied, using the URL to search the table each time the HTML document is obtained, and having the corresponding rule stored in the user rule storing portion 1101 if such a URL is stored in the table.

For example, the user can make a predetermination on whether a genre is specified before the selection of a shop, or a shop is selected directly, for the HTML document in FIG. 5.

In the above described embodiments, the case where input/output of voice is performed using the speaker and microphone connected directly to the apparatus has been described, but the present invention is not limited thereto, and other input/output devices may be used. For example, a telephone machine that is connected to the apparatus via a telephone line may be used.

Figure 12:
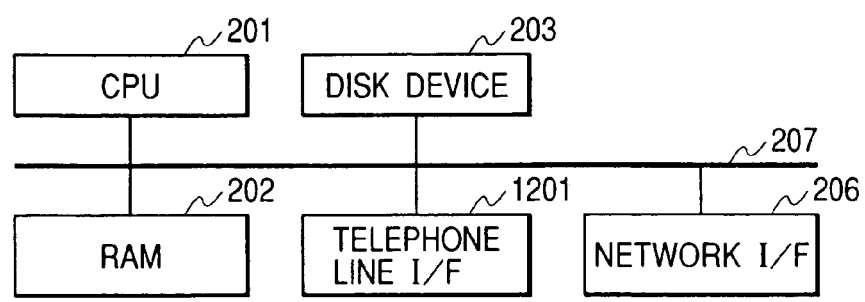
FIG. 12 shows a hardware configuration of another embodiment.

FIG. 12 shows a hardware configuration of an information presentation apparatus of this embodiment in the case of using a telephone machine. In this figure, devices of 201 to 203, and 206 and 207 are similar to their counterparts in FIG. 2. Reference numeral 1201 denotes a telephone line interface, and it sends voice data generated by the voice output portion 107 to an external telephone machine via a telephone line, and receives voice data to be processed by the voice input portion 108 from the external telephone machine via the telephone line.

In the above described embodiments, the case where every input/output for the voice browser apparatus is performed using voice has been described, but the present invention is not limited thereto, and inputting means other than voice may be used in part. For example, the number of the input candidate may be inputted with key strokes instead of voice-inputting the input candidate.

For example, in the case of the above described configuration in which the telephone machine is used, the number is inputted through the dial button of the telephone machine, and the tone thereof is received, whereby the number input can be accepted. As for how to add the number, there is, for example, a method in which the number is added in ascending order of appearance of input candidates in the HTML document, with 1 being the first. Also, for this purpose, the number may be outputted along with the input candidate. For example, when the input/output content storing portion 106 is in the state of FIG. 6, "Please select a genre of shops, and then select a shop. First, French. Second, Italian." may be outputted.

In the above described embodiments, the case where as a rule for defining voice input/output contents, two rules, namely the rule of reading indexes and the rule of reading the text ending with the <HR> tag are switched to each other has been described, but the present invention is not limited thereto, and various rules may be defined. For example, the rule for determining whether or not the number of the aforesaid input candidate is outputted may be designated. As a method of designation in the HTML document, the method in which a NUMBER attribute is provided for the <VB> tag, and output is performed when the value is ON, and input is performed when the value is OFF may be used.

In the above described embodiments, the case where the <VB> tag is used as a method of designating a rule by the HTML has been described, but the present invention is not limited thereto, and other tags may be used. Also, it may be added to the attribute of a <BODY> tag. Alternatively, it may be embedded in a comment.

In the above described embodiments, the case where the rule is incorporated in the voice browser apparatus in advance, and a label corresponding to the rule is designated has been described, but the present invention is not limited thereto, and the rule itself may be designated from outside. For example, in the above described embodiments, the object of output is all the text, but it is also possible to limit the contents to be outputted to the section surrounded by specific tags and list the tags in the HTML document. For example, they may be listed as the value of the OUTTAG attribute of the <VB> tag. Alternatively, the tag to constitute the endpoint of the output is fixed to the <HR> tag in the above described embodiments, but a tag to constitute the endpoint of output may be designated in the HTML document. For example, it may be designated as the value of the ENDTAG attribute of the <VB> tag.

The HTML document is targeted in the above described embodiments, but the present invention is not limited thereto, and documents written in markup language with HTML partially extended/changed or other markup languages may be targeted.

In the above described embodiments, the case where recognition statements of voice recognition are prepared in advance has been described, but the present invention is not limited thereto, and the statement may be created from input candidates.

In the above described embodiments, the case where voice input is accepted after the end of voice output has been described, but the present invention is not limited thereto, and voice input may be accepted midway through voice output.

In the above described embodiments, the case where a program required for operations is stored in the disk device has been described, but the present invention is not limited thereto, and it may be achieved using any storage medium. Also, it may be achieved using a circuit operating in a similar way.

According to the embodiments described above, a plurality of rules for defining voice output contents and input candidates is prepared from documents written in predetermined markup language, and the creator of documents or the user can designate which of the rules is to be used, thus making it possible to change voice input/output contents easily without changing the content part of the document.

Furthermore, as long as the feature of the above described embodiments can be achieved, the present invention may be applied to a system comprising a plurality of apparatuses (a computer main body, an interface apparatus, a display, etc.), or may be applied to equipment comprising a single apparatus.

Also, those implemented by supplying the computer in an apparatus or a system connected to various kinds of devices with a program code of software for achieving the features of the aforesaid embodiments, and operating the above described various kinds of devices by the computer (or CPU and MPU) of the system or the apparatus, in accordance with the supplied program, for the purpose of operating the various kinds of devices so that the features of the aforesaid embodiments are achieved are also included in the scope of the present invention. Also, in this case, the program code itself read from the storage medium achieves the features of the aforesaid embodiments, and the program code itself and means for supplying the program code to the computer, for example the storage medium storing the program code therein constitute the present invention.

As for storage media for supplying the program code, for example, a floppy disk, a hard disk, an optical disk, a magneto-optic disk, a CD-ROM, a CD-R, a magnetic tape, a nonvolatile memory card and a ROM may be used.

Also, needless to say, not only when the features of the aforesaid embodiments are achieved by executing the program code read out by the computer, but also when the features of the aforesaid embodiments are achieved by performing cooperative work with the OS (operating system) operating on the computer or other application software, based on instructions of the program code, the program code is included in the scope of the present invention.

Furthermore, needless to say, the case where after the program code read from the storage medium is written in a memory provided in the feature expansion board inserted in the computer or the feature expansion unit connected to the computer, the CPU or the like provided in the feature expansion board or the feature expansion unit performs part or all of actual processing, based on instructions of the program code, and the features of the aforesaid embodiments are achieved by the processing is also included in the scope of the present invention.

When the present invention is applied to the above described storage medium, a program code corresponding to the flowchart previously described may be stored in the storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A document processing apparatus comprising:
document obtaining means for obtaining a document written in a predetermined markup language from a designated source;
rule identification information extraction means for extracting a first attribute value of a first predetermined tag in the document obtained by said document obtaining means as rule identification information;
rule selecting means for selecting a rule corresponding to the extracted rule identification information from among a plurality of rules stored in a rule memory, each of the plurality of rules specifying respective sections of voice output contents and voice input candidates in the obtained document, and said rule selecting means selecting a predetermined one of the plurality of rules if the first predetermined tag is not contained in the obtained document;
document analyzing means for analyzing the document obtained by said document obtaining means based on the rule selected by said rule selecting means to extract voice output contents, voice input candidates, and designation information for designating a next processing object corresponding to each voice input candidate, from the respective sections of the obtained document specified by the rule selected by said rule selecting means, said document analyzing means extracting a second attribute value of the first predetermined tag as the voice output contents and text surrounded by second predetermined tags as the voice input candidates if the selected rule is a first rule, and extracting text in a range from a head to a third predetermined tag in the document as the voice output contents and anchors in the range as the voice input candidates if the selected rule is a second rule;
voice output means for voice-outputting the voice output contents extracted by said document analyzing means;
voice recognizing means for voice-recognizing a voice input by a user; and
control means for checking the result of recognition by said voice recognizing means against the input candidates extracted by said document analyzing means to control obtaining of a new document by said document obtaining means or next analysis by said document analyzing means based on a next processing object designated by designation information corresponding to an input candidate matching the recognition result.

2. The document processing apparatus according to claim 1, wherein in the first rule, if the recognition result matches an input candidate, contents ranging from the contents surrounded by said second predetermined tags which correspond to the input candidate up to a succeeding one of the second predetermined tags are defined as next voice output contents, and anchors in the next voice output contents are defined as next input candidates.

3. The document processing apparatus according to claim 1, wherein the voice input and voice output are performed through a telephone line.

4. The document processing apparatus according to claim 1, wherein said rule identification information is a predetermined attribute value of a predetermined tag.

5. The document processing apparatus according to claim 1, wherein said document analyzing means extracts as the designation information a source from which a next document is obtained.

6. The document processing apparatus according to claim 1, wherein said document analyzing means extracts an analyzed range of a next document as the designation information.

7. The document processing apparatus according to claim 1, wherein said rule selecting means selects a rule based on instructions from the user.

8. The document processing apparatus according to claim 7, wherein a priority is given to a predetermined one of the rules based on the user's instructions and the rule based on the rule identification information extracted by said rule identification information extraction means, and said rule selecting means selects the rule to which the priority is given.

9. A document processing method comprising:

a document obtaining step of obtaining a document written in a predetermined markup language from a designated source;

a rule identification information extraction step of extracting a first attribute value of a first predetermined tag in the document obtained in said document obtaining step as rule identification information;

a rule selecting step for selecting a rule corresponding to the extracted rule identification information from among a plurality of rules stored in a rule memory, each of the plurality of rules specifying respective sections of voice output contents and voice input candidates in the obtained document, and a predetermined one of the plurality of rules being selected in said rule selecting step if the predetermined tag is not contained in the obtained document;

a document analyzing step of analyzing the document obtained in said document obtaining step based on the rule selected in said rule selecting step to extract voice output contents, voice input candidates, and designation information for designating a next processing object corresponding to each voice input candidate, from the respective sections of the obtained document specified by the rule selected in said rule selecting step, and in said document analyzing step, a second attribute value of the first predetermined tag is extracted as the voice output contents and text surrounded by second predetermined tags is extracted as the voice input candidates if the selected rule is a first rule, and text in a range from a head to a third predetermined tag in the document is extracted as the voice output contents and anchors in the range are extracted as the voice input candidates if the selected rule is a second rule;

a voice outputting step of voice-outputting the voice output contents extracted in said document analyzing step;

a voice recognizing step of voice-recognizing a voice input from a user; and a control step of checking the result of recognition obtained in said voice recognizing step against the input candidates extracted in said document analyzing step to control obtaining of a new document in said document obtaining step or next analysis in said document analyzing step based on a next processing object designated by designation information corresponding to an input candidate matching the recognition result.

10. A computer-executable program, embodied in a computer-readable medium, for controlling a computer to perform document processing, said program comprising codes for causing the computer to perform:

a document obtaining step of obtaining a document written in a predetermined markup language from a designated source;

a rule identification information extraction step of extracting a first attribute value of a first predetermined tag in the document obtained in said document obtaining step as rule identification information;

a rule selecting step for selecting a rule corresponding to the extracted rule identification information from among a plurality of rules stored in a rule memory, each of the plurality of rules specifying respective sections of voice output contents and voice input candidates in the obtained document, and a predetermined one of the plurality of rules being selected in said rule selecting step if the predetermined tag is not contained in the obtained document;

a document analyzing step of analyzing the document obtained in said document obtaining step based on the rule selected in said rule selecting step to extract voice output contents, voice input candidates, and designation information for designating a next processing object corresponding to each voice input candidate, from the respective sections of the obtained document specified by the rule selected in said rule selecting step, and in said document analyzing step, a second attribute value of the first predetermined tag is extracted as the voice output contents and text surrounded by second predetermined tags is extracted as the voice input candidates if the selected rule is a first rule, and text in a range from a head to a third predetermined tag in the document is extracted as the voice output contents and anchors in the range are extracted as the voice input candidates if the selected rule is a second rule;

a voice outputting step of voice-outputting the voice output contents extracted in said document analyzing step;

a voice recognizing step of voice-recognizing a voice input from a user; and a control step of checking the result of recognition obtained in said voice recognizing step against the input candidates extracted in said document analyzing step to control obtaining of a new document in said document obtaining step or next analysis in said document analyzing step based on a next processing object designated by designation information corresponding to an input candidate matching the recognition result.

11. A computer-readable storage medium for storing the program according to claim 10.

* * * * *